United States Patent [19]

Fetzer

[11] Patent Number: 4,614,994
[45] Date of Patent: Sep. 30, 1986

[54] ELECTRICAL WOUND CAPACITOR WITH INTERNAL SERIES CONNECTION

[75] Inventor: Jürgen Fetzer, Dettingen, Fed. Rep. of Germany

[73] Assignee: Siemens Aktiengesellschaft, Berlin & Munich, Fed. Rep. of Germany

[21] Appl. No.: 726,793

[22] Filed: Apr. 24, 1985

[30] Foreign Application Priority Data

May 21, 1984 [DE] Fed. Rep. of Germany ....... 3418901

[51] Int. Cl.$^4$ .......................... H01G 1/01; H01G 4/16
[52] U.S. Cl. ....................................... 361/303; 361/324
[58] Field of Search .............. 361/301, 303, 323, 324, 361/311, 313, 273, 278

[56] References Cited

U.S. PATENT DOCUMENTS 1,568,918  1/1926  Pfiffner ........................... 361/303 X

FOREIGN PATENT DOCUMENTS 67652   5/1973  Luxembourg .
884927 12/1961  United Kingdom .

Primary Examiner—L. T. Hix
Assistant Examiner—Douglas S. Lee
Attorney, Agent, or Firm—Hill, Van Santen, Steadman & Simpson

[57] ABSTRACT

An electrical wound capacitor having an internal series connection is composed of wound paper tapes which are provided with regerably thin metal layers. The paper tape used as contacted electrode comprises two metal layers that are connected to front contact layers. At the beginning and end of the winding, the paper tape is provided with an incision in the region of the free strip to prevent edge to edge arcing.

10 Claims, 5 Drawing Figures

ELECTRICAL WOUND CAPACITOR WITH INTERNAL SERIES CONNECTION

BACKGROUND OF THE INVENTION

1. Field of the Invention

The invention relates to capacitors and more particularly to electrical wound capacitors.

2. Description of the Prior Art

Electrical wound capacitors are employed for damping pulsating d.c. voltages, whereby support capacitors can briefly emit high currents given periodic peak power consumption and thus support a d.c. voltage network.

The capacitors are particularly employed in power electronics and have nominal voltages $\geq -3$ kV. the internal series connection is employed so that such capacitors can be utilized with good operating reliability given overvoltage. A paper tape that has two metal layers separated from one another by a free strip is thereby employed as contacted electrode, whereby the connection to the external electrode terminals ensues via front contact (schoopage) layers. A further paper tape is provided with a metal layer that is not connected to the schoopage layers. Under known conditions, non-metallized paper tapes can be co-wound, these being referred to as filler paper.

A weak point of the internal series connection is the cut or intersecting edges of the contacted electrode with free strips at the beginning and end of the winding. During operationally caused overvoltages, the capacitor windings fail here due to arcing from coating edge to coating edge at the free strip. This arcing is elicited in that the field lines at the beginning and end of the winding lead through a gap having the thickness of a dielectric ply which may be filled with impregnation agent under normal conditions. Since the insulation here is thinner than that of the capacitor paper, the arcing from coating edge to coating edge is facilitated.

It is in fact possible in an attempt to avoid this problem, to burn off the metal layers at the beginning and end of the winding by means of applying a high-frequency voltage, whereby a coating-free area arises. This procedure, however, is time intensive and requires high capital costs at the winding machine. Further, there is the risk that the capacitor paper may be damaged due to discharges during the burn-off.

Further, there would also be the possibility of complicating the arcing by widening the free strip. The capacitance of the capacitor winding, however, would be thereby diminished.

SUMMARY OF THE INVENTION

An object of the invention is to provide an electrical wound capacitor with internal series connection which has no arcing from coating edge to coating edge upon operationally caused overvoltages.

This object is inventively achieved in that the paper tape connected to the front contact layers includes an cut edge at the beginning and end of the winding in the region of the free strip. The cut edge is preferably step-shaped or arrow-shaped.

Advantageous developments of the invention provide that the tip angle of the arrow-shaped cut edge is less than or equal to 90°, whereby the arrow-shaped cut edge is preferably symmetrically arranged. The cut edge can have either a straight or curved shape.

The advantages of a capacitor of the invention shall be explained in greater detail with reference to the following illustrative embodiments.

DESCRIPTION OF THE PREFERRED EMBODIMENTS

Figure 1:
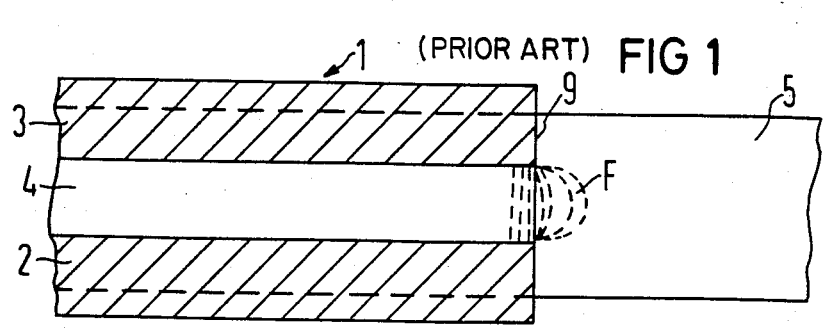
FIG. 1 is a section of a traditional wound capacitor in a plan view.

FIG. 1 shows the plan view of a paper tape 1 which has regenerably thin metal layers 2,3 of, for example, zinc at its two longitudinal sides. The two metal layers 2, 3 are separated from one another by a free strip 4. The width of the free strip 4 depends on the nominal voltage of the capacitor. Also visible in FIG. 1 is a non-metallized filler paper 5 that is disposed beneath the paper tape 1. The metal layers 2 and 3 are connected to front contact layers (not shown in the FIG.) to which external terminals (likewise not shown in the FIG.) are attached.

The paper tape 1 employed as a contacted electrode comprises a straight cut edge 9. The course of the electrical field lines F in the region of the cut edge 9 is shown in FIG. 1.

Figure 2:
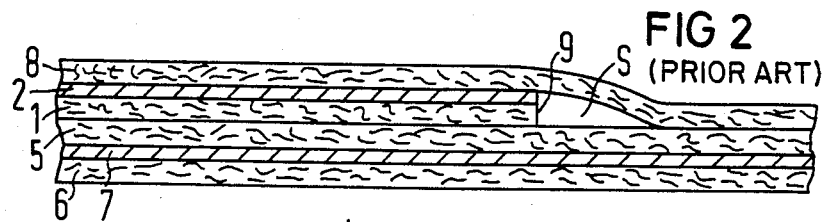
FIG. 2 is a section of a traditional wound capacitor in a side view.

FIG. 2 shows a side view in which a non-metallized filler paper 8 is disposed above the paper tape 1. The metal layer 7 of the internal series connection that is not connected to the front contact layers is situated on another paper tape 6. It may be seen in FIG. 2 that a gap S arises in the region of the cut edge 9 when winding and this gap can, for example, be filled with a hard-wax oil. It may be seen from FIGS. 1 and 2 that the electrical field lines F between the metal layers 2 and 3 next to the cut edge 9 also proceed through the impregnation gap S on only slightly longer paths. Even when the gap S is filled with hard-wax and oil mixture, the insulation at this location is substantially poorer than that of the paper tape 1 (by a factor of about 3). The cut edge 9 thus becomes a preferred location for charge carrier bridges and arcing between the metal layers 2 and 3 is promoted.

Figure 3:
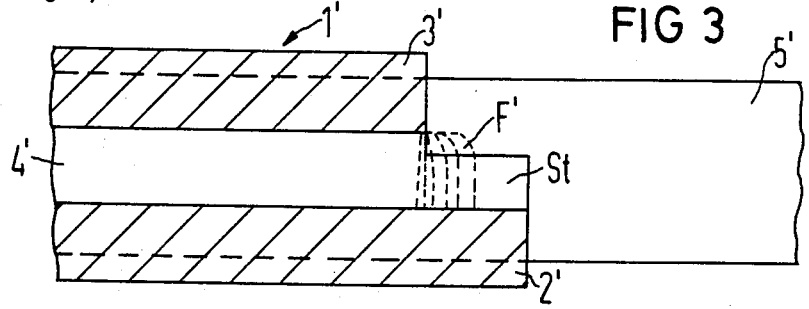
FIG. 3 is a plan view of a section of a capacitor having a step shaped cut edge.

FIG. 3 shows a capacitor wherein the paper tape 1' comprises a step-shaped cut edge St in the region of the free strip 4. The course of the field lines F' between the metal layers 2' and 3' shows that the insulating path is significantly enlarged, since the field lines F' largely no longer proceed through the gap but through the paper tape. As may be derived from FIG. 3, the greatest effect is achieved when the step-shaped cut edge St terminates with a metallization edge. In this manner, one of the metal layers, shown in FIG. 3 as layer 2' will extend further forward than the other metal layer 3'. The cut edge St of the free strip 4' will preferably extend up to the edge of the forwardmost extending metal layer 2'.

Figure 4:
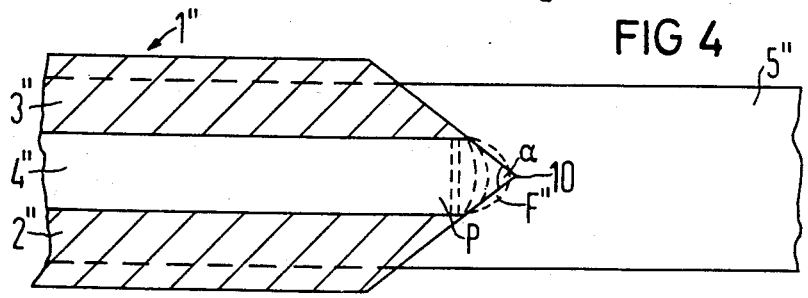
FIG. 4 is a plan view of a capacitor having an arrow-shaped cut edge.
Figure 5:
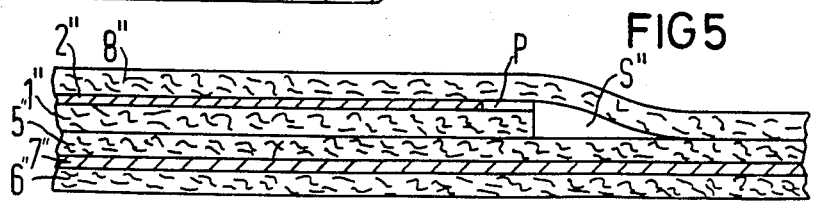
FIG. 5 is a side view of a capacitor having an arrow-shaped cut edge.

FIGS. 4 and 5 show a alternate embodiment of a capacitor incorporating the present invention. It may be seen in FIG. 4 that the paper tape 1" comprises an arrow-shaped cut edge P at the beginning of the foil and at the end of the foil (not shown in the FIG.). The course of the electrical field lines F''' between the metal layers 2'' and 3'' in the region of the arrow-shaped cut edge P is shown in FIG. 4. Due to the projecting paper of the free strip 4'', the field lines F''' up to the tip of the arrow proceed at least partially through the dielectric. Only after 10 do they then likewise proceed only through the impregnation gap. The path of the field lines, however, is then at least 1.5 times longer than the width of the free strip 4''. Thus, the cut edge P forms a tab or projection at the beginning and end of the foil of the free strip 4'' between the metal layers 2'' and 3''.

An apparent widening of the free strip 4'' thus ensues in the region of the cut edge as a result of the arrow-shaped cut edge P, whereby an arcing between the metal layers 2'' and 3'' is prevented in a reliable fashion without having the capacitance of the capacitor being diminished due to a wider free strip.

The angle $\alpha$ at the tip of the arrow-shaped cut edge P is advantageously smaller than or equal to 90°. The arrow-shaped cut edge is preferably symmetrically disposed so that the tip 10 lies on the center axis of the paper tape 1''. The cut edge can have an angular shape with linear segments as is shown in FIGS. 3 and 4, or it could have a rounded shape, similar to the shape shown by the field lines F''' in FIG. 4.

Tests performed on more than 60 capacitors have shown that no capacitor failed during overvoltages due to arcing between the metal layers 2 and 3 at the arrow-shaped cut edge P.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. An electrical wound capacitor comprising an internal series connection, particularly a damping and support capacitor that can suddenly be periodically charged and discharged, which is composed of wound paper tapes that are provided with regenerably thin metal layers, whereby two metal layers on a first paper tape are separated from one another by a free strip and a second paper tape contains a metal layer, and wherein further non-metallized filler paper tapes are co-wound with said first and second paper tapes, the improvement that the first paper tape includes a cut edge at the beginning and end of the winding in the region of the free strip, wherein said cut edge is step-shaped.

2. An electrical wound capacitor comprising an internal series connection, particularly a damping and support capacitor that can suddenly be periodically charged and discharged, which is composed of wound paper tapes that are provided with regenerably thin metal layers, whereby two metal layers on a first paper tape are separated from one another by a free strip and a second paper tape contains a metal layer, and wherein further non-metallized filler paper tapes are co-wound with said first and second paper tapes, the improvement that the first paper tape includes a cut edge at the beginning and end of the winding in the region of the free strip, wherein said cut edge is arrow-shaped.

3. An electrical wound capacitor according to claim 2, wherein a tip angle of the arrow-shaped cut edge is smaller than or equal to 90°.

4. An electrical wound capacitor comprising an internal series connection, particularly a damping and support capacitor that can suddenly be periodically charged and discharged, which is composed of wound paper tapes that are provided with regenerably thin metal layers, whereby two metal layers on a first paper tape are separated from one another by a free strip and a second paper tape contains a metal layer, and wherein further non-metallized filler paper tapes are co-wound with said first and second paper tapes, the improvement that the first paper tape includes a cut edge at the beginning and end of the winding in the region of the free strip, wherein said cut edge has an angular shape.

5. An electrical wound capacitor comprising an internal series connection, particularly a damping and support capacitor that can suddenly be periodically charged and discharged, which is composed of wound paper tapes that are provided with regenerably thin metal layers, whereby two metal layers on a first paper tape are separated from one another by a free strip and a second paper tape contains a metal layer, and wherein further non-metallized filler paper tapes are co-wound with said first and second paper tapes, the improvement that the first paper tape includes a cut edge at the beginning and end of the winding in the region of the free strip, wherein said cut edge has a curved shape.

6. In an electrical wound capacitor having an internal series connection composed of wound insulative tapes provided with regenerably thin metal layers, two metal layers on a first insulative tape are separated from one another by a free strip, a second insulative tape has a metal layer, and further non-metallized filler insulative tapes are co-wound with the first and second paper tapes, the improvement wherein said first tape includes an incision at the beginning and end of the winding in the region of the free strip, wherein said incision is step-shaped.

7. In an electrical wound capacitor having an internal series connection composed of wound insulative tapes provided with regenerably thin metal layers, two metal layers on a first insulative tape are separated from one another by a free strip, a second insulative tape has a metal layer, and further non-metallized filler insulative tapes are co-wound with the first and second paper tapes, the improvement wherein said first tape includes an incision at the beginning and end of the winding in the region of the free strip, wherein said incision is arrow-shaped.

8. An electrical wound capacitor according to claim 7, wherein a tip angle of the arrow-shaped incision is smaller than or equal to 90°.

9. In an electrical wound capacitor having an internal series connection composed of wound insulative tapes provided with regenerably thin metal layers, two metal layers on a first insulative tape are separated from one another by a free strip, a second insulative tape has a metal layer, and further non-metallized filler insulative tapes are co-wound with the first and second paper tapes, the improvement wherein said first tape includes an incision at the beginning and end of the winding in the region of the free strip, wherein said incision has an angular shape.

10. In an electrical wound capacitor having an internal series connection composed of wound insulative tapes provided with regenerably thin metal layers, two metal layers on a first insulative tape are separated from one another by a free strip, a second insulative tape has a metal layer, and further non-metallized filler insulative tapes are co-wound with the first and second paper tapes, the improvement wherein said first tape includes an incision at the beginning and end of the winding in the region of the free strip, wherein said incision has a curved shape.

* * * * *